United States Patent

[11] 3,610,781

| [72] | Inventors | Erich Kolb<br>Eisental;<br>Hubert Mainka, Buhlertal, both of Germany |
|---|---|---|
| [21] | Appl. No. | 883,378 |
| [22] | Filed | Dec. 9, 1969 |
| [45] | Patented | Oct. 5, 1971 |
| [73] | Assignee | Robert Bosch GmbH<br>Stuttgart, Germany |
| [32] | Priority | Dec. 10, 1968 |
| [33] | | Germany |
| [31] | | P 18 13 638.4 |

[54] WINDSHIELD WIPER MOTOR AND PUMP ASSEMBLY
15 Claims, 14 Drawing Figs.

[52] U.S. Cl. .................................................. 417/319,
417/360, 418/70, 415/201, 64/11
[51] Int. Cl. ................................................. F04b 9/00,
F03c 3/00, F01d 1/02

[50] Field of Search............................................ 417/319,
360, 410, 420, 229, 395; 418/70, 69; 415/201,
219; 64/11 R, 27 R

[56] References Cited
UNITED STATES PATENTS

| 1,082,183 | 12/1913 | Vernon .......................... | 417/410 X |
| 1,918,713 | 7/1933 | Ponselle ......................... | 417/360 |
| 2,382,539 | 8/1945 | Brady, Jr. ....................... | 417/360 |
| 2,755,900 | 7/1956 | Seyfried ......................... | 64/11 R X |
| 3,227,087 | 1/1966 | Albee et al..................... | 415/219 |

*Primary Examiner*—Robert M. Walker
*Attorney*—Michael S. Striker

ABSTRACT: A pump for spraying water on a windshield, has a pump casing which can be snapped on the casing of a motor driving the windshield wipers. A clutch connects the pump shaft with the motor shaft when the pump casing is held on the motor casing by resilient arresting means.

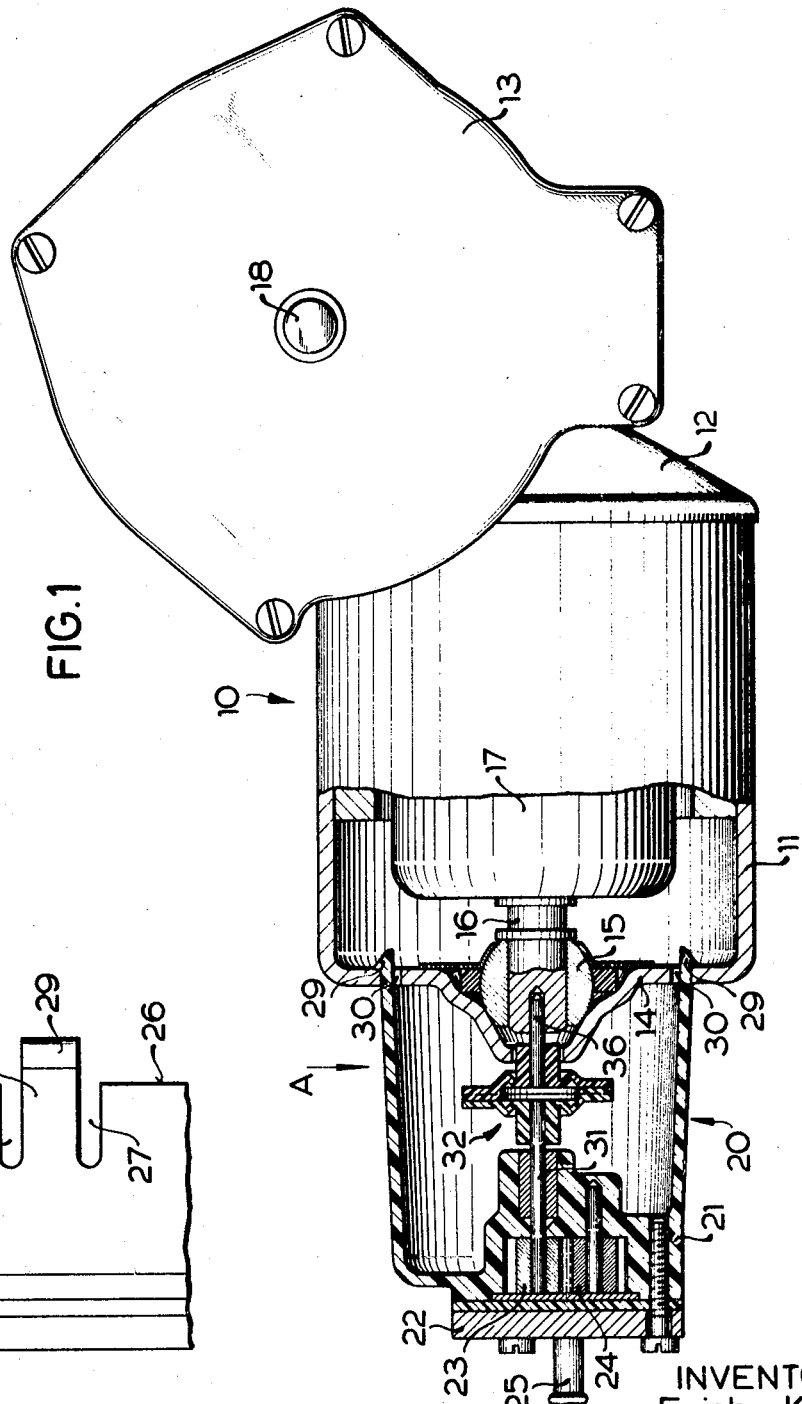

INVENTORS
Erich KOLB
Hubert MAINKA

By their ATTORNEY

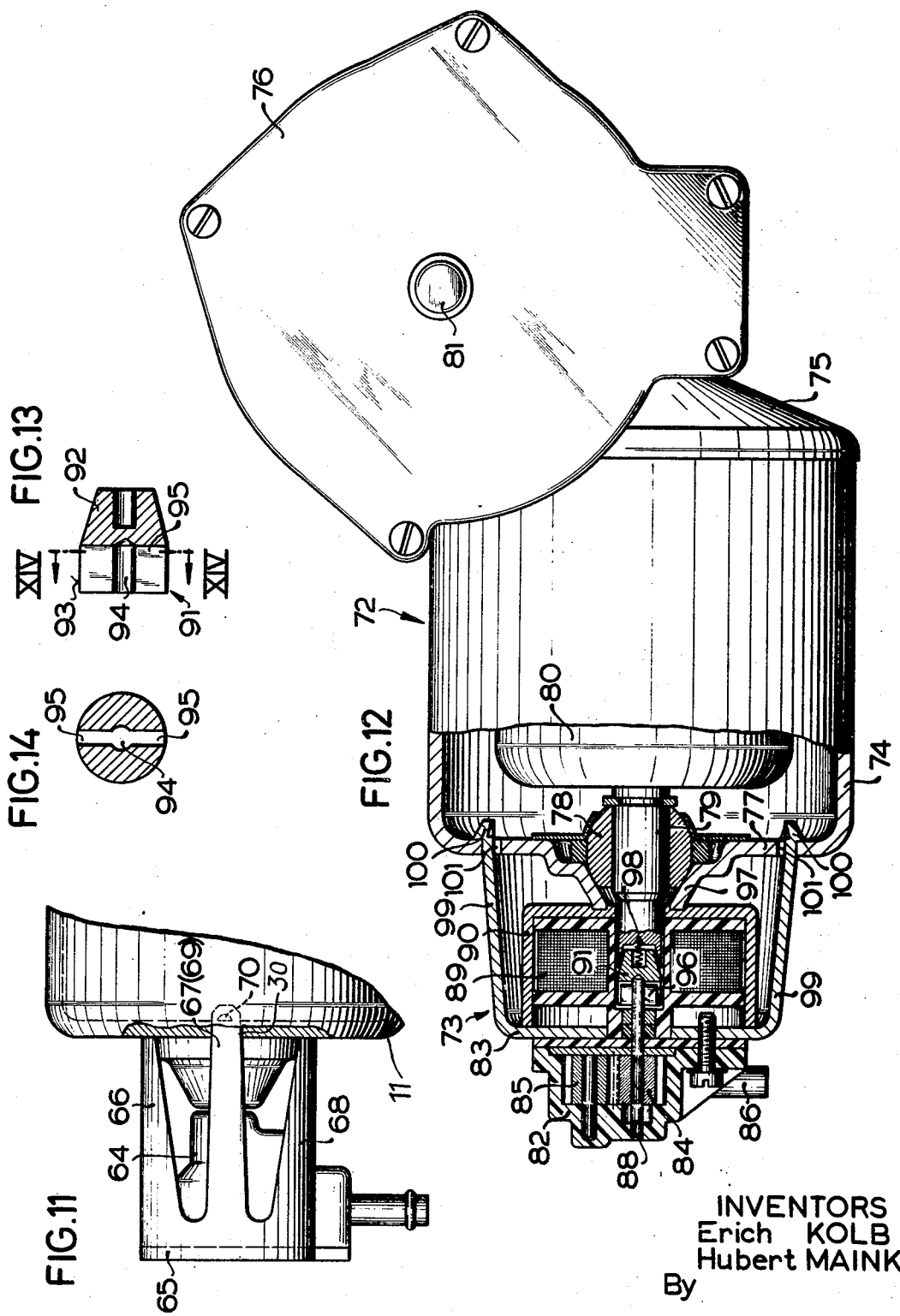

3,610,781

WINDSHIELD WIPER MOTOR AND PUMP ASSEMBLY

BACKGROUND OF THE INVENTION

It is known to drive a pump providing wash water for a windshield by the motor which drives the windshield wipers. In the apparatus according to the prior art, the pump is secured by screws to the motor casing which requires a time-consuming assembly, and loose parts.

SUMMARY OF THE INVENTION

It is one object of the invention to overcome this disadvantage of known motor and pump assemblies, and to provide an arrangement in which the pump can be simply snapped onto the casing of the motor.

Another object of the invention is to obtain a driving connection between the motor shaft and the pump shaft when the pump is manually attached to the motor casing.

With these objects in view, the present invention provides cooperating arresting means on the pump casing and motor casing which resiliently engage each other when the pump casing is manually placed on the motor casing.

In the preferred embodiment, clutch parts are mounted on the pump shaft and motor shaft, respectively, and automatically engage when the pump is attached to the motor casing. As a result, attachment and securing of the pump to the motor casing requires no further parts or operations.

It is advantageous to construct the clutch so that it slips under an overload, and requires a small force for obtaining engagement of the two clutch parts, while the engaged clutch is capable of transmitting a great torque.

In a space-saving modification, the clutch is operated by an electromagnet whose winding is concentric to the motor shaft and whose armature forms one of the clutch parts.

One embodiment of the invention comprises a housing for the windshield wiper drive; a motor having a motor shaft, and a motor casing having first attaching means and being fixedly secured to the housing; a pump having a pump shaft, and a pump casing having second attaching means, one of the first and second attaching means being resilient; and a clutch having a first clutch part connected with the motor shaft and a second clutch part connected with the pump shaft for rotation.

The pump is manually movable from a detached position spaced from the motor to a working position in which the clutch parts are engaged, the pump casing abuts the motor casing, and the second arresting means and first arresting means resiliently engage each other for holding and supporting the pump on the motor casing.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1 is a side elevation, partially in section, illustrating a first embodiment of the invention;

FIG. 2 is a fragmentary plan view taken in the direction of the arrow A in FIG. 1;

FIG. 11 is a fragmentary plan view illustrating a modification of the pump casing used in the embodiment of FIG. 6;

FIG. 12 is an elevation, partially in section, illustrating a fourth embodiment of the invention;

FIG. 13 is a fragmentary view on an enlarged scale illustrating a clutch part of the embodiment of FIG. 12; and FIG. 14 is a fragmentary sectional view taken on line XIV—XIV in FIG. 13.

DESCRIPTION OF THE PREFERRED EMBODIMENTS

Figure 3:
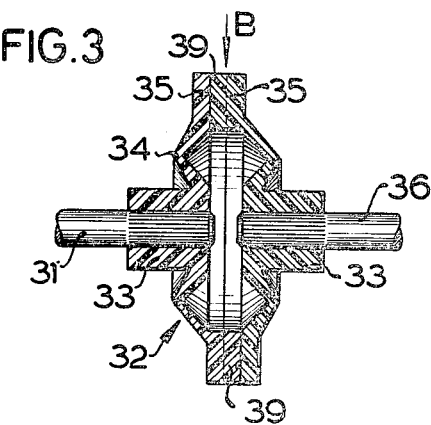
FIG. 3 is an axial sectional view on an enlarged scale illustrating the clutch of the embodiment of FIG. 1.

Referring first to the embodiment of FIGS. 1 to 4, a motor 10 has a pot-shaped casing 11 with a cover 12 which is a portion of a housing 13 in which the mechanism for driving windshield wipers, not shown, is disposed. Motor casing 11 has an end wall 14 which supports a bearing 15 of motor shaft 16, which is also mounted in a bearing in cover 12, not shown. An armature 17 is secured to shaft 16 which also carries a commutator, not shown. Motor shaft 16 projects into housing 13 and carries a worm, not shown, which engages a worm gear, not shown, on the drive shaft 18 which drives through a crank drive, not shown, and a connecting linkage, the wipers for the windshield of a motor car. The wiper drive is known, and not an object of the present invention.

It is desirable to spray water on the windshield before the wiping operation, and a pump 20 is provided for this purpose. In the embodiment of FIG. 1, pump 20 has a pump casing 21 consisting of a synthetic elastic material which has a cavity in which two meshing gears 23, 24 are located. A cover 22 closes the cavity, and is secured by screws. The gear pump means 23, 24 transports water from a suction pipe 25 to a pressure chamber which is connected with an outlet, not shown, from which water is discharged when the pump operates.

Pump casing 21 has a substantially circular edge 26, see FIG. 2, which is interrupted by slots 27 which form a resilient arresting arm with a catch 29 at its free end. At least two, but preferably four arresting arms 28 are provided and cooperate, respectively, with openings 30 in the end wall 14 of the motor casing 11. In the attached working position shown in FIG. 1, catches 29 arrest the pump housing 21 in a working position in which the remaining portions of the edge 26 abut the outer surface of end wall 14. Due to the triangular shape of the catches 29, the arresting arms 28 are resiliently displaced when the pump 20 is manually moved to the working position shown in FIG. 1, and when the arms 28 have penetrated the openings 28 and the catches snap to the illustrated position, the edge portion 26 abuts the end wall 14 so that the pump is rigidly held on the motor casing, although only a very simple operation was required for attaching the pump to the motor. To separate the pump casing from the motor casing, the resilient arms 28 have to be manually pressed inwardly in radial direction.

Gear 24 is mounted on a shaft secured to pump casing 21, while shaft 31 of gear 23 has a free end on which a clutch part of a clutch 32 is fixed, while the respective other clutch part is fixed to a thin shaft portion 36 which is fixedly secured in an axial bore of motor shaft 16 and forms a part of the same.

Figure 4:
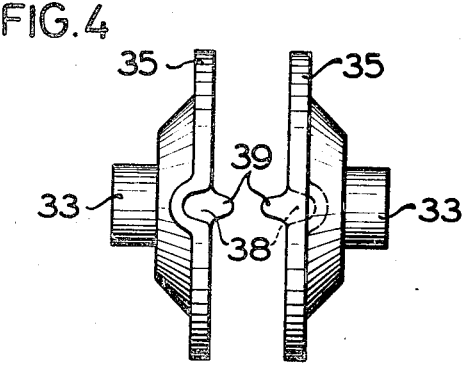
FIG. 4 is a view taken in the direction of the arrow B in FIG. 3 and illustrating the clutch in a disengaged position.
Figure 5:
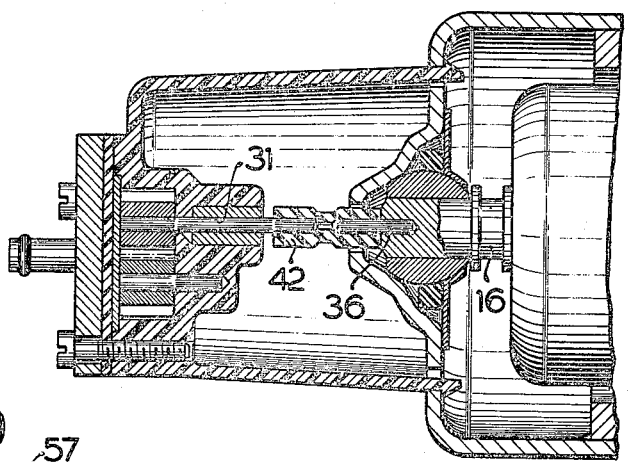
FIG. 5 is a fragmentary sectional view illustrating a second embodiment of the invention.

Each clutch part has a hub 33 mounted on the respective shaft 31 and 36 and connected by a membrane 34 with an annular coupling portion 35, as best seen in FIGS. 3 and 4. Each annular coupling portion has a recess 38 and a coupling projection 39 which are diametrically disposed so that each projection 39 can engage the recess 38 in the other coupling part.

The arrangement is such that when the pump is attached to the motor casing 11, as shown in FIG. 1, the clutch parts engage each other. Due to the membrane portions 34, the annular coupling portions 35 are resiliently displaced when coupling projections 39 at first do not engage the respective coupling recesses 38, but when the motor shaft rotates, the coupling projections 39 fall into the coupling recesses 38 and the coupling is engaged so that rotary motion is transmitted from the motor shaft 16 to the pump shaft 31.

In the position of FIG. 1 in which the catches 29 engage the end wall 14, the resilient coupling halves resiliently engage each other and are slightly deformed. The axially acting resilient forces are selected so that clutch 32 is capable of transmitting the torque required for driving pump 20. If the pump is jammed for any reason, the slanted coupling projections 39 are pressed out of the respective coupling recesses 38 while the membranes 34 are resiliently deformed so that the clutch slips.

When the pump is manually attached to the motor casing 11 during assembly, the catches 29 are pushed through the openings 30 so that they are momentarily inwardly displaced and then snap outwardly to the position illustrated in FIG. 1 to hold the pump casing 21 in the working position in which the coupling halves engage each other. When the pump is detached from the motor casing 11, the clutch part mounted on pump shaft 31 is also removed.

Pump 20 operates continuously as long as motor 10 is energized and rotates. The pressure outlet of the pump is provided with a valve, not shown, and a return conduit so that the water is idly circulated without being discharged when no spraying of water onto the windshield is desired during the operation of the wipers.

Figures 6, 10:
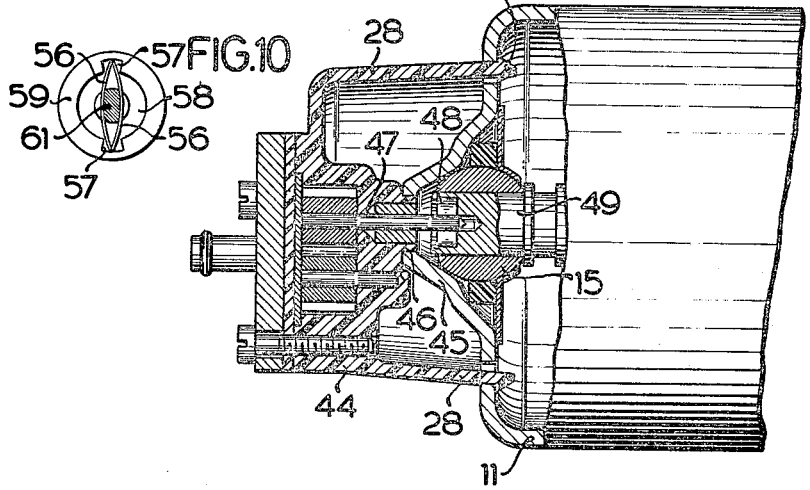
FIG. 6 is a fragmentary sectional view illustrating a third embodiment of the invention.
FIG. 10 is a fragmentary end view of the clutch shown in FIG. 9.

In the embodiment of FIG. 6, motor casing 11 is mounted on housing 13 and motor shaft 49 is connected with drive shaft 18, as described with reference to FIG. 1. The pump has a pump casing 44 with a central portion 46 projecting into an opening in a central outward convex portion 45 of the end wall of the motor casing 11 so that the pump casing 44 is held in the desired working position while the catches of the resilient arresting arms 28 hold the pump casing 44 on the motor casing 11, as described with reference to FIGS. 1 and 2.

Figure 7:
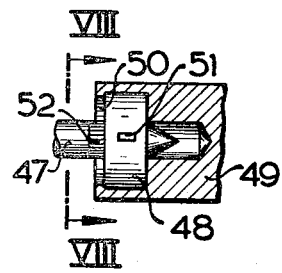
FIG. 7 is a fragmentary sectional view on an enlarged scale illustrating the clutch of the embodiment of FIG. 6.
Figure 8:
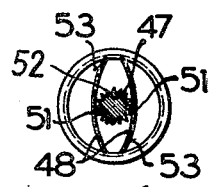
FIG. 8 is a fragmentary sectional view taken on the line VIII—VIII in FIG. 7.

Pump shaft 47 has a free end which is connected with the free end of motor shaft 49 by a clutch shown in detail in FIGS. 7 and 8. The free end of pump shaft 47 has a circular row of teeth 52, and motor shaft 49 has a circular recess 50 surrounded by a circular wall. A pair of outwardly convex curved leaf springs 53 is set into recess 50 and has ends engaging the circular wall surrounding recess 50. The diameter of recess 50 is smaller than the length of the leaf springs 53 so that the same are resiliently deformed and exert resilient pressure against the circular wall surrounding recess 50. Each leaf spring has a middle portion with a projection 51, the two projections projecting in opposite directions of rotation, and engaging the teeth 52. When motor shaft 49 rotates in the direction of the arrow in FIG. 8, the ends 53 of leaf springs 48 bite into the wall of recess 50, and couple shafts 47 and 49 to each other. The resilient leaf springs 48 permit rotation of motor shaft 49 when the pump and pump shaft 47 are jammed.

Figure 9:
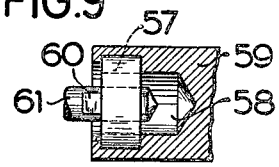
FIG. 9 is a fragmentary sectional view illustrating a modified clutch.

FIGS. 9 and 10 illustrate a modified clutch in which the leaf springs 56 have ends located and locked in radial recesses 57 provided in the circular wall of a motor shaft 59. The middle portions of the leaf spring 56 resiliently abut flat faces of pump shaft 61 which are diametrically displaced. Springs 56 rotate with motor shaft 59 and drive pump shaft 61. When the pump is jammed, the leaf springs are spread to the full diameter of pump shaft 61 so that motor shaft 59 can continue to rotate.

In the embodiment of FIG. 11, the pump gears are located in a casing 64 consisting of a synthetic plastic material, and casing 64 is closed by a casing portion 65 consisting of metal and having four arms 66, 67, 68 and 69. Two diametrically disposed arms 67, 69 have arresting catches 70 cooperating with openings 30 in motor casing 11 as described with reference to FIG. 1, while intermediate arms 66 and 68 have free ends abutting casing 11. This construction is particularly suitable for motors designed to withstand short circuits, since excessive heat is dissipated by the metal casing portion 65, while pump casing portions directly in contact with the motor casing and consisting of synthetic material may be damaged by excessive heat.

In the embodiment illustrated in FIGS. 12, 13 and 14, the motor 72 supports a gear pump 73. Motor 72 has a pot-shaped motor casing 74 with a cover 75 integral with the wall of housing 76 of the mechanism for driving the wipers. The end wall 77 carries a part-spherical bearing bushing 78 in which the motor shaft 79 is mounted for rotation together with the armature 80 and a commutator, not shown. Motor shaft 79 projects into housing 76 and is connected by a transmission, not shown, with the drive shaft 81.

Gear pump 73 has a casing portion 82 consisting of a synthetic material and closed by a metal casing part 83. Meshing gears 84 and 85 in the cavity of housing 82 produce suction at the inlet 86, and pressure at the outlet of the pump, not shown.

Pump gear 84 is secured to a pump shaft 88 which can be connected by an electromagnetic clutch with motor shaft 79. The clutch has a winding 89 which is located in a pot-shaped metal housing secured to casing portion 83, and surrounds the free end of motor shaft 79. A frustoconical magnetizable clutch member 91 is mounted for axial movement on pump shaft 88, and is connected with the same for rotation. Clutch member 91 has a frustoconical surface 92 and a cylindrical portion 93 provided with the central bore 94 and with radial slots 95. The end of pump shaft 88 projects into bore 94 and carries two diametrically disposed radially projecting lugs 96 which are located in the slots 95 of the magnetizable clutch member 91 and connect the same with pump shaft 88 for rotation, while axial displacement of clutch member 91 is possible. The frustoconical surface 92 of clutch member 91 can move into a corresponding frustoconical recess in the end face of motor shaft 79 which passes through a raised circular portion 97 into the interior of the winding 89. The angle of the cooperating frustoconical surfaces is somewhat greater than the friction angle which is determined by the texture of the frustoconical surfaces. A spring 98 biases clutch member 91 away from motor shaft 79 to a position in which the bottom of the bore 94 abuts the end face of pump shaft 88. The pot-shaped housing part 90 has an annular groove engaged by the circular edge of the end wall portion 97, and being centered by the same. Casing portion 83 has four arresting arms 99 which are circumferentially spaced equal distances, and have free ends with arresting means 100 which engage the inner face of end wall 77. When the arms 99 pass through the openings 101 in end wall 77, the resilient arresting arms 99, 100 hold the pump while housing 90 abuts end wall portion 97 and centers housing 90 and casings 82 and 83 in a position in which pump shaft 88 is aligned and coaxial with motor shaft 79.

During assembly, the pump 73 together with the magnetizable clutch member 91 and spring 89 is pushed in axial direction onto motor casing 74, while the arresting catches 100 first pass through openings 101 while arms 99 are deformed, whereupon the catch portions 100 snap outwardly to arrest the pump casing 99 when the inner housing portion 90 abuts the raised portion 97 of end wall 77.

When winding 89 is deenergized, spring 98 pushes clutch member 91 into the illustrated position in which the clutch is disengaged. When winding 89 is energized, clutch member 91 is displaced against the action of spring 98 until its frustoconical surface 92 abuts the frustoconical surface in the recess in motor shaft 79, so that a friction torque occurs between shaft 79 and clutch member 91 by which the clutch member with pump shaft 88 is rotated so that the gears 84 and 85 rotate and the pump pumps water. Due to the frustoconical shape of the friction surfaces, a comparatively small axial pressure results in a high pressure between the engaging frustoconical friction surfaces so that the clutch can transmit a comparatively great torque although operated by a small electromagnetic winding. To stop the pump while motor 70 continues to rotate and to drive the windshield wipers, the winding 89 is deenergized so that spring 98 returns clutch member 91 to its initial position and the clutch is disengaged so that no torque is transmitted from motor shaft 88 to pump shaft 79.

It will be understood that each of the elements described above, or two or more together, may also find a useful application in other types of motor and pump assemblies differing from the types described above.

While the invention has been illustrated and described as embodied in a motor and pump assembly for driving windshield wipers and supplying water to the same including a pump snapped onto the motor housing, and a clutch connecting the motor shaft with the pump shaft, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed as new and desired to be protected by Letters Patent is set forth in the appended claims.

We claim:

1. Motor and pump assembly, particularly for driving windshield wipers and for supplying water to the same, comprising a motor having a motor shaft and a motor casing having first arresting means; and a pump having a pump shaft and a pump casing having second arresting means, said pump being manually movable from a detached position spaced from said motor to a working position in which said pump shaft is connected with said motor shaft for rotation, one of said first and second arresting means including resilient portions formed with catch means for self-engaging the respective other arresting means in said working position so that said pump casing is supported on said motor casing.

2. Motor and pump assembly as claimed in claim 1 wherein said pump casing ans said motor casing have abutment portions abutting each other in said working position.

3. Motor and pump assembly as claimed in claim 1 wherein said resilient portions of said one arresting means are resilient portions of the respective casing.

4. Motor and pump assembly as claimed in claim 1 wherein said one arresting means includes resilient portions of said pump casing having free ends formed with catch means for engaging said motor casing in said working position, and wherein said motor casing and said pump casing have abutment portions abutting each other in said working position.

5. Motor and pump assembly as claimed in claim 4 wherein said pump casing consists of a synthetic material, is substantially pot-shaped, and has an annular wall having said resilient portions and an edge forming said abutment portions between said resilient portions.

6. Motor and pump assembly as claimed in claim 4 wherein at least two diametrically spaced narrow resilient portions of said pump casing have said catch means; and wherein said pump casing has at least two diametrically spaced narrow abutment portions staggered relative to said resilient portions and abutting said motor casing.

7. Motor and pump assembly as claimed in claim 6 wherein said pump casing has a casing part made of a synthetic material, and a cover part made of metal and having said resilient portions and said abutment portions.

8. Motor and pump assembly as claimed in claim 1 wherein said motor casing has an end wall having an outward convex circular center portion with a central opening; and wherein said pump casing has a center portion located in said central opening abutting said center portion in said working position; wherein said one arresting means include at least two resilient arms having free ends with catch means; and wherein said end wall of said motor casing is formed with two openings engaged by said catch means in said working position.

9. Motor and pump assembly as claimed in claim 1 wherein said pump shaft and said motor shaft are aligned in said working position; and comprising a clutch for connecting said motor shaft with said pump shaft in said working position, said clutch engaging when said pump is moved to said working position and disengaging when said pump is moved out of said working position.

10. Motor and pump assembly as claimed in claim 9 wherein said clutch includes a first clutch part attached to said motor shaft and a second clutch part attached to said pump shaft, each clutch part consisting of synthetic elastic material and including a membrane and an outer annular coupling portion, one of said coupling portions having a recess and the other coupling portion having a projection engaging each other in the engaged position of said clutch and being disengaged by an overload so that said annular coupling portions slide on each other.

11. Motor and pump assembly as claimed in claim 9 wherein said shafts have adjacent free ends; and wherein said clutch includes two diametrically disposed flat coupling faces at said free end of one of said shafts, and an axial recess at said free end of the other shaft, and a pair of leaf springs located in said recess and having ends locked in the same, and middle portions resiliently abutting said flat faces, respectively.

12. Motor and pump assembly as claimed in claim 9 wherein said shafts have adjacent free ends; and wherein said clutch includes a toothed annular surface at said free end of one of said shafts, an annular wall at said free end of the other shaft forming an axial recess, and a pair of curved leaf springs in said recess having ends engaging said wall of said recess and middle portions formed with projections, respectively, engaging said toothed annular surface.

13. Motor and pump assembly as claimed in claim 9 wherein said shafts have adjacent free ends; and wherein said clutch includes a frustoconical recess formed in said free end of one of said shafts, a frustoconical magnetizable clutch member mounted for axial movement on said free end of the other shaft and being connected with the same for rotary movement, and electromagnetic means including a winding concentric with said shafts and operable for moving said clutch member between a disengaged position, and an engaged position frictionally engaging said frustoconical recess.

14. Motor and pump assembly as claimed in claim 13 wherein said other shaft has at least one radial projection, and wherein said clutch member has a central bore receiving said free end of said other shaft, and at least one axially extending recess in said bore receiving said projection so that said clutch member can move in axial direction while being connected with said other shaft for rotation by said recess and projection.

15. Motor and pump assembly, particularly for driving windshield wipers and for supplying water to the same: a housing for the windshield wiper drive; a motor having a motor shaft and a motor casing having first arresting means and being fixedly secured to said housing; a pump having a pump shaft and a pump casing having second arresting means, one of said first and second arresting means including resilient portions formed with catch means for self-engaging the respective other arresting means; and a clutch having a first clutch part connected with said motor shaft and a second clutch part connected with said pump shaft for rotation, said pump being manually movable from a detached position spaced from said motor to a working position in which said clutch parts are engaged, said pump casing abuts said motor casing, and said one arresting means resiliently engages the respective other arresting means for holding and supporting said pump casing and said pump on said motor casing.